US009388744B2

(12) United States Patent
Mathews, Jr. et al.

(10) Patent No.: US 9,388,744 B2
(45) Date of Patent: Jul. 12, 2016

(54) DISTRIBUTED GAS TURBINE ENGINE CONTROL SYSTEM WITH REMOTE INTERFACE UNITS

(75) Inventors: Harry Kirk Mathews, Jr., Clifton Park, NY (US); Brent Jerome Brunell, Clifton Park, NY (US); Simon Shlomo Lis, Cincinnati, OH (US); R. Sheldon Carpenter, Cincinnati, OH (US); Samhita Dasgupta, Schenectady, NY (US); Sridhar Adibhatla, Glendale, OH (US); Scott Douglas Waun, West Chester, OH (US); Emad Andarawis Andarawis, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 1019 days.

(21) Appl. No.: 13/436,184

(22) Filed: Mar. 30, 2012

(65) Prior Publication Data

US 2013/0255220 A1 Oct. 3, 2013

(51) Int. Cl.

*F02C 9/00* (2006.01)
*F02C 9/16* (2006.01)
*F02C 9/26* (2006.01)
*F02C 9/48* (2006.01)
*F02C 7/057* (2006.01)

(52) U.S. Cl.

CPC ............... *F02C 9/00* (2013.01); *F05D 2270/46* (2013.01); *Y02T 50/671* (2013.01)

(58) Field of Classification Search

CPC .............. F02C 7/057; F02C 9/00; F02C 9/16; F02C 9/26; F02C 9/48; F05D 2270/46; F05D 2270/44; Y02T 50/671

See application file for complete search history.

(56) References Cited

U.S. PATENT DOCUMENTS

| | | | | |
|---|---|---|---|---|
| 5,136,841 | A * | 8/1992 | Zimmerman | 60/233 |
| 7,779,811 | B1 * | 8/2010 | Mailander et al. | 123/399 |
| 2005/0049775 | A1 | 3/2005 | Mooney | |
| 2005/0171651 | A1 * | 8/2005 | Loda et al. | 701/2 |
| 2007/0055435 | A1 * | 3/2007 | Muramatsu et al. | 701/100 |
| 2009/0312892 | A1 | 12/2009 | Mahoney et al. | |
| 2010/0242492 | A1 * | 9/2010 | Sloat et al. | 60/793 |
| 2010/0274416 | A1 * | 10/2010 | Poisson | 701/3 |

(Continued)

FOREIGN PATENT DOCUMENTS

CN 101667013 A 3/2010

OTHER PUBLICATIONS

Shaffer: "Distributed Control System for Turbine Engines", ASME, Journal of Engineering for Gas Turbines and Power, Jan. 1999, vol. 121, pp. 102-107.

(Continued)

*Primary Examiner* — Carlos A Rivera
(74) *Attorney, Agent, or Firm* — John P. Darling

(57) ABSTRACT

In one embodiment, a gas turbine engine control system includes an engine controller configured to control multiple parameters associated with operation of a gas turbine engine system. The gas turbine engine control system also includes multiple remote interface units communicatively coupled to the engine controller. The remote interface unit is configured to receive an input signal from the engine controller indicative of respective target values of at least one parameter, and the remote interface unit is configured to provide closed-loop control of the at least one parameter based on the input signal and feedback signals indicative of respective measured values of the at least one parameter.

7 Claims, 3 Drawing Sheets

(56) References Cited

U.S. PATENT DOCUMENTS

2010/0292870 A1 11/2010 Saint Marc et al.
2011/0038268 A1* 2/2011 Ross et al. .................... 370/252

OTHER PUBLICATIONS

DeCastro et al., "Analysis of Decentralization and Fault-Tolerance Concepts for Distributed Engine Control", 45th AIAA/ASME/SAE/ASEE Joint Propulsion Conference and Exhibit, Aug. 2009, Denver, CO, pp. 1-17.
Jakovljevic et al., "Expectations and Vision for True Modular Distributed Engine Control—Beyond 1st project", 44th AIAA/ASME/SAE/ASEE Joint Propulsion Conference and Exhibit, Jul. 2008, Hartford, CT, pp. 1-11.
Sghairi et al., "Distributed and Reconfigurable Architecture for Flight Control System", Digital Avionics Systems Conference, DASC '09. IEEE/AIAA 28th, Oct. 2009, pp. 6.B.2-1-6.B.2-10.
Giron-Sierra et al., "A New Distributed Avionics System Based on the CANbus and Homogeneous Nodes", Industrial Technology, IEEE ICIT '04. 2004 IEEE International Conference, Dec. 2004, pp. 892-897.
Unofficial English Translation of Chinese Office Action issued in connection with corresponding CN Application No. 201310103102.1 on Sep. 1, 2015.

* cited by examiner

36
IGNITER A
60
IGNITER B
62
RIU
40
RIU
40

EXCITER
58
64
66
CHAN B
42
70
72
COMM. MODULE
LLCM
CONTROLLER
SENSOR
ACTUATOR
74
68
76
CHAN A
40
54
56
RIU
ENGINE CONTROLLER
38
POWER CONDITIONING MODULE
52
ENGINE CONTROL MODULE
50
FROM ELECTRICAL POWER SYSTEM
TO FLIGHT CONTROL SYSTEM

DISTRIBUTED GAS TURBINE ENGINE CONTROL SYSTEM WITH REMOTE INTERFACE UNITS

BACKGROUND

The subject matter disclosed herein relates to a distributed gas turbine engine control system.

Gas turbine systems typically employ an engine controller, such as a full authority digital engine controller (FADEC), to control various parameters associated with operation of the gas turbine system. For example, the engine controller may be configured to receive an input signal (e.g., indicative of throttle setting, desired fuel mixture, etc.) from a remote network, and to adjust various operational parameters of the gas turbine system based on the input signal. By way of example, if the controller receives an input signal indicative of a desired throttle setting, the engine controller may rotate compressor vanes to a desired angle, adjust positions of fuel valves, and/or adjust cooling air flow to turbine blades to establish the desired throttle setting.

Certain engine controllers utilize a first control loop to compute target values of the operational parameters based on the input signal, and a second control loop to adjust the operational parameters based on the target values. To facilitate control of the operational parameters, multiple actuators may be communicatively coupled to the engine controller. In addition, sensors may be communicatively coupled to the engine controller to provide feedback signals indicative of measured values of the operational parameters, thereby enabling the engine controller to provide closed-loop control of the actuators. In certain embodiments, the sensors may be disposed within a housing of the engine controller, and a line/tube may extend between each sensor and a respective component associated with the parameter. For example, the engine controller may be configured to control compressor exit pressure by adjusting a valve position based on a measured compressor exit pressure. Accordingly, a tube may extend from a pressure tap to an electronic pressure transducer within the engine controller. In this configuration, the engine controller may monitor compressor exit pressure based on feedback from the electronic transducer, and adjust the position of the valve until the measured pressure is substantially equal to a desired pressure.

As the number of controlled parameters within the gas turbine system increases, the number of sensors within the engine controller, and the corresponding number of lines/tubes also increase. The increased number of sensors may increase the size of the engine controller housing, thereby increasing the difficulty associated with mounting the engine controller within an engine nacelle. In addition, the increased number of lines/tube may increase the weight of the engine control system, thereby reducing vehicle performance. Moreover, because the sensors within the engine controller are selected to measure parameters associated with a particular engine configuration, modifying the engine configuration (e.g., varying the number and/or type of controlled parameters) may prompt a redesign and recertification of the engine controller. Accordingly, the duration and costs associated with engine development may be undesirably increased.

BRIEF DESCRIPTION

In one embodiment, a gas turbine engine control system includes an engine controller configured to control multiple parameters associated with operation of a gas turbine engine system. The gas turbine engine control system also includes multiple remote interface units communicatively coupled to the engine controller. The remote interface unit is configured to receive an input signal from the engine controller indicative of respective target values of at least one parameter, and the remote interface unit is configured to provide closed-loop control of the at least one parameter based on the input signal and feedback signals indicative of respective measured values of the at least one parameter.

In another embodiment, a gas turbine engine control system includes multiple remote interface units distributed throughout a gas turbine engine system. The remote interface unit includes an actuator configured to adjust a respective parameter associated with operation of the gas turbine engine system, a sensor configured to output a feedback signal indicative of a measured value of the respective parameter, and an interface controller communicatively coupled to the actuator and to the sensor. The interface controller is configured to provide closed-loop control of the actuator based on the feedback signal. The gas turbine engine control system also includes an engine controller communicatively coupled to the remote interface unit. The engine controller is configured to instruct the interface controller to establish a target value of the respective parameter.

In a further embodiment, a gas turbine engine control system includes an engine controller configured to control multiple parameters associated with operation of a gas turbine engine system. The gas turbine engine control system also includes multiple remote interface units communicatively coupled to the engine controller. At least one remote interface unit includes at least one local loop closure module having an interface controller. The at least one remote interface unit also includes an actuator communicatively coupled to the interface controller, and configured to adjust one parameter. In addition, the at least one remote interface unit includes a sensor communicatively coupled to the interface controller, and configured to output a feedback signal indicative of a measured value of the one parameter. The interface controller is configured to provide closed-loop control of the actuator based on the feedback signal and an input signal from the engine controller indicative of a target value of the one parameter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
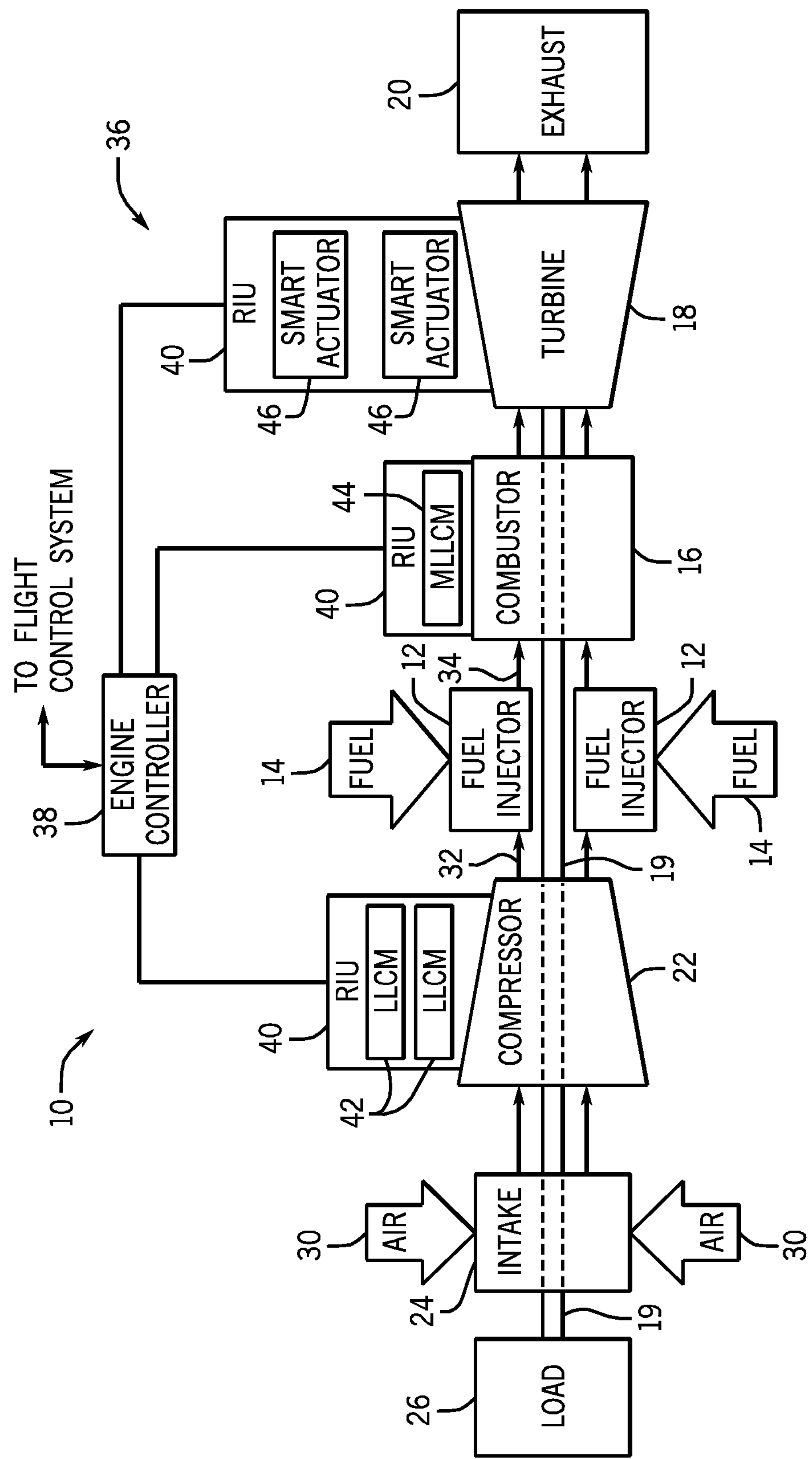
FIG. 1 is a block diagram of an embodiment of a turbine system including a distributed control system configured to adjust various operational parameters of the turbine system via multiple remote interface units distributed throughout the turbine system.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may substantially reduce the weight and complexity of an engine control system by distributing remote interface units throughout a turbine system to provide local control of parameters associated with operation of the turbine system. In certain embodiments, a gas turbine engine control system includes an engine controller configured to control multiple parameters associated with operation of the gas turbine engine system. The gas turbine engine control system also includes multiple remote interface units communicatively coupled to the engine controller. The remote interface unit is configured to receive an input signal from the engine controller indicative of a target value of an operational parameter. The remote interface unit is also configured to provide closed-loop control of the operational parameter based on the input signal and a feedback signal indicative of a measured value of the operational parameter. The remote interface units may be distributed throughout the gas turbine engine system to control a variety of operational parameters, such as valve positions, vane orientations, and fluid pressures, among others. In certain embodiments, the remote interface unit includes an actuator configured to adjust the operational parameter, and a sensor configured to output the feedback signal.

Because the remote interface units provide local control of the operational parameters, the weight and complexity of the engine control system may be substantially reduced, as compared to configurations in which the engine controller directly controls the operational parameters. For example, because the sensors are communicatively coupled to local remote interface units, lines/tubes extending between components associated with each parameter and sensors mounted within the engine controller are obviated, thereby reducing the weight of the engine control system. In addition, because the sensors are not disposed within the engine controller, the size of the engine controller may be reduced, thereby facilitating engine controller mounting within an engine nacelle. Furthermore, the number of controlled parameters may be adjusted by varying the number of remote interface units and/or the number of actuators/sensors within each remote interface unit. Accordingly, a single engine controller configuration may be employed to control operation of a variety of engine configurations (e.g., having different numbers and/or types of operational parameters), thereby obviating the process of redesigning and recertifying the engine controller for each engine configuration. As a result, engine development costs may be significantly reduced.

Turning now to the drawings, FIG. 1 is a block diagram of an embodiment of a turbine system including a distributed control system configured to adjust various operational parameters of the turbine system via multiple remote interface units distributed throughout the turbine system. While a turbine system is described below, it should be appreciated that the distributed control system may be utilized to adjust operational parameters within other rotary machines or turbo machines, such as a compressor, a jet engine, a pump, or a steam turbine, for example. The illustrated turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized gas into a turbine 18. As will be appreciated, the turbine 18 includes one or more stators having fixed vanes or blades, and one or more rotors having blades which rotate relative to the stators. The hot gas passes through the turbine rotor blades, thereby driving the turbine rotor to rotate. Coupling between the turbine rotor and a shaft 19 causes rotation of the shaft 19, which is also coupled to several components throughout the gas turbine system 10, as illustrated. Eventually, the gas exits the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes a distributed engine control system 36 having an engine controller 38, and multiple remote interface units (RIU) 40 distributed throughout the turbine system 10. The engine controller 38 is configured to control multiple parameters associated with operation of the turbine system 10. For example, the engine controller may be configured to receive instructions from a remote network, and to control the operational parameters of the turbine system 10 based on the instructions. By way of example, if the engine controller 38 receives instructions to establish a desired throttle setting, the engine controller 38 may send signals to the remote interface units 40, instructing the remote interface units 40 to adjust various operational parameters of the turbine system 10 to achieve the desired throttle setting. For example, the engine controller 38 may instruct the remote interface unit 40 coupled to the compressor 22 to adjust a compressor vane angle. The engine controller 38 may also instruct the remote interface unit 40 coupled to the combustor 16 to open valves that provide increased fuel flow to the combustor 16. In addition, the engine controller 38 may instruct the remote interface unit 40 coupled to the turbine 18 to open valves that provide additional cooling air flow to the turbine blades. In this manner, a desired throttle setting may be achieved while maintaining turbine system efficiency. In the illustrated embodiment, the engine controller 38 is configured to receive instructions from a flight control system of an aircraft. However, it should be appreciated that the engine controller 38 may receive instructions from a ground-based control network, or any other suitable system configured to provide instructions to the engine controller 38.

Each remote interface unit 40 within the turbine system 10 is communicatively coupled to the engine controller 38, and configured to receive an input signal from the engine controller 38 indicative of a target value of an operational parameter. For example, the engine controller 38 may send an input signal to the remote interface unit 40 coupled to the compressor 22 indicative of a target vane angle. Similarly, the engine controller 38 may send an input signal to the remote interface unit 40 coupled to the combustor 16 indicative of a fuel valve position. Each remote interface unit 40, in turn, is configured to provide closed-loop control of the operational parameter based on the input signal and a feedback signal indicative of a measured value of the parameter. Accordingly, if the engine controller 38 instructs the remote interface unit 40 coupled to the compressor 22 to rotate the compressor vanes to a target angle, the remote interface unit 40 may instruct an actuator to rotate the vanes to the target angle based on a feedback signal from a sensor configured to measure the vane angle. Furthermore, if the engine controller 38 instructs the remote interface unit 40 coupled to the combustor 16 to set a fuel valve to a target position, the remote interface unit 40 may instruct an actuator to adjust the valve to the target position based on a feedback signal from a sensor configured to measure valve position.

Certain remote interface units 40 include one or more local loop closure modules (LLCM) 42 configured to independently provide closed-loop control of a respective operational parameter. For example, in the illustrated embodiment, the remote interface unit 40 coupled to the compressor 22 includes two local loop closure modules 42. As discussed in detail below, each local loop closure module 42 includes an interface controller configured to provide closed-loop control of an actuator based on a feedback signal from a sensor and the input signal from the engine controller 38. Each remote interface unit 40 may include 1, 2, 3, 4, 5, 6, 7, 8, 9, 10, or more local loop closure modules 42 to provide closed-loop control of a corresponding number of operational parameters. Accordingly, each remote interface unit 40 may control parameters associated with a component (e.g., compressor 22, combustor 16, turbine 18, etc.) coupled to the remote interface unit 40, thereby providing distributed control of the turbine system 10.

An alternative embodiment of a remote interface unit 40 is coupled to the combustor 16. The remote interface unit 40 includes a multiple local loop closure module (MLLCM) 44 configured to provide closed-loop control of multiple parameters associated with operation of the turbine system 10. As discussed in detail below, the multiple local loop closure module 44 includes an interface controller configured to provide closed-loop control of multiple actuators based on feedback signals from multiple sensors. For example, the remote interface unit 40 may include multiple actuators configured to adjust a respective set of operational parameters, and multiple sensors configured to output a respective set of feedback signals. In such embodiments, the interface controller of the multiple local loop closure module 44, which is communicatively coupled to each actuator and to each sensor, is configured to provide closed-loop control of the actuators based on the respective feedback signals. In this manner, a single multiple local loop closure module 44 within the remote interface unit 40 may control multiple operational parameters associated with a component (e.g., compressor 22, combustor 16, turbine 18, etc.) of the turbine system 10. While the illustrated remote interface unit 40 includes a single multiple local loop closure module 44, it should be appreciated that additional local loop closure modules and/or multiple local loop closure modules may be included in alternative embodiments of the remote interface unit 40.

As illustrated, another embodiment of a remote interface unit 40 is coupled to the turbine 18. The remote interface unit 40 includes two smart actuator assemblies 46. Each smart actuator assembly 46 includes an actuator configured to adjust an operational parameter of the turbine system 10, and a sensor configured to output a feedback signal indicative of a measured value of the operational parameter. Each smart actuator assembly 46 also includes an interface controller configured to provide closed-loop control of the actuator based on the feedback signal and the input signal from the engine controller 38 indicative of the target value of the parameter. Certain remote interface units 40 may include 1, 2, 3, 4, 5, 6, 7, 8, 9, 10, or more smart actuator assemblies 46 to provide closed-loop control of a corresponding number of operational parameters. Other remote interface units 40 may include at least one smart actuator assembly 46, at least one local loop closure module 44, and/or at least one multiple local loop closure module 44.

While three remote interface units 40 are employed in the illustrated embodiment, it should be appreciated that alternative engine control systems 36 may employ more or fewer remote interface units 40. For example, in certain embodiments, the engine control system 36 may include 1, 2, 3, 4, 5, 6, 7, or more remote interface units distributed throughout the turbine system 10. Furthermore, it should be appreciated that the remote interface units 40 may be mounted within a variety of locations throughout the turbine system 10. For example, a remote interface unit may be mounted on an exterior surface of the compressor 22, within a core of the turbine 18, and/or between the turbine 18 and the combustor 16, for example. In certain embodiments, each component of the remote interface unit may be disposed within a single housing. Alternatively, sensors and/or actuators may be mounted remote from the housing, and communicatively coupled to the interface controller, which is disposed within the housing. For example, a remote interface unit housing mounted on the exterior surface of the compressor 22 may be communicatively coupled to a sensor mounted within the turbine core.

As previously discussed, each remote interface unit 40 includes a sensor configured to measure an operational parameter. Because the sensors are not disposed within the engine controller, line/tubes configured to convey pressures/temperatures to the engine controller are obviated. Consequently, the weight of the engine control system 36 may be reduced. In addition, the size of the engine controller 38 may be reduced because the sensors are mounted within respective remote interface units 40, thereby facilitating engine controller mounting within an engine nacelle. Moreover, the engine controller 38 may be utilized to control a variety of engine configurations by varying the type and/or number of remote interface units communicatively coupled to the engine controller. Accordingly, the process of redesigning and recertifying the engine controller for varying engine configurations is obviated, which reduces turbine system development costs.

Figure 2:
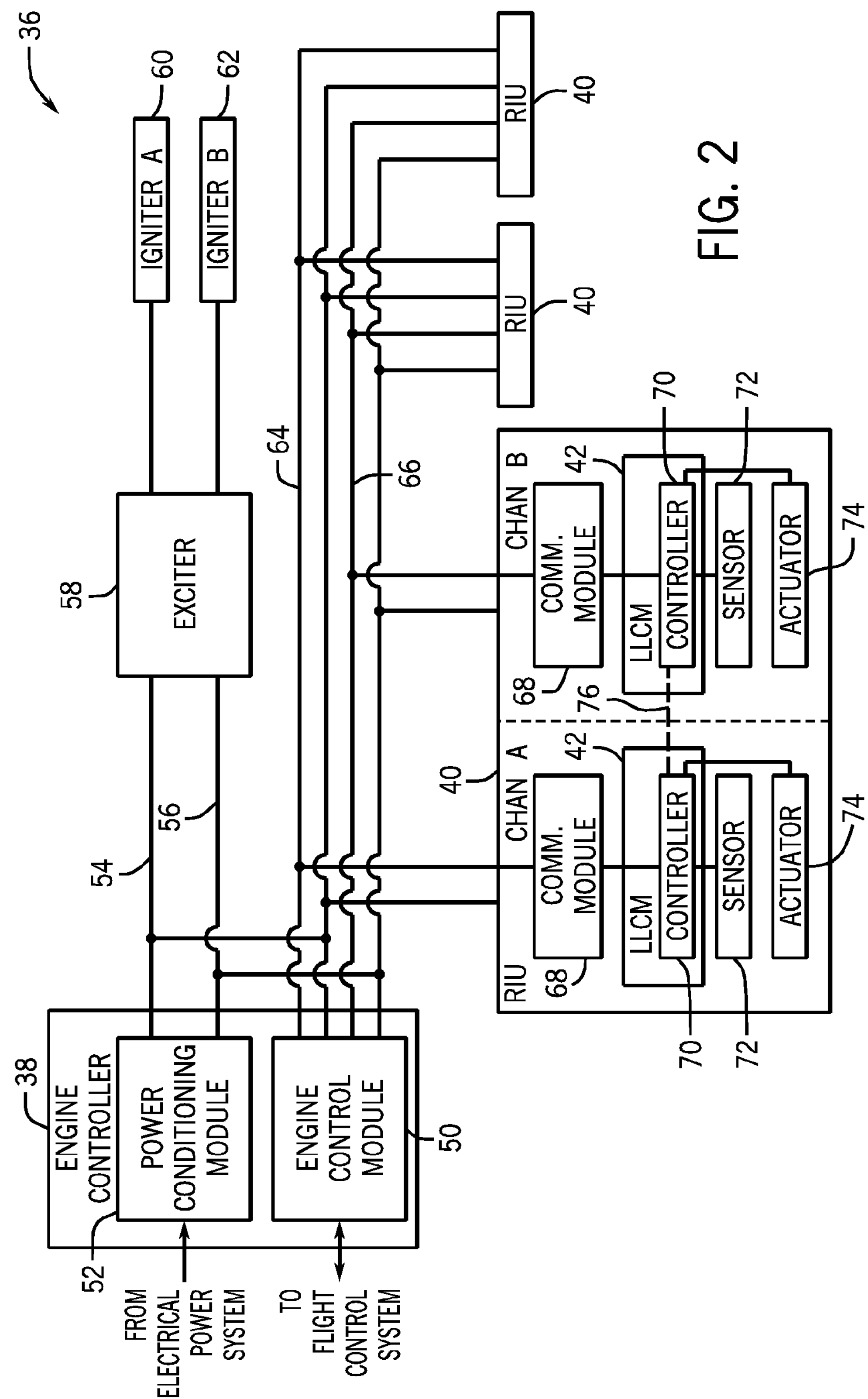
FIG. 2 is a block diagram of an embodiment of a distributed control system that may be employed within the turbine system of FIG. 1.

FIG. 2 is a block diagram of an embodiment of a distributed control system 36 that may be employed within the turbine system 10 of FIG. 1. In the illustrated embodiment, the engine controller 38 includes an engine control module 50 configured to control multiple parameters associated with operation of the turbine system 10, and a power conditioning module 52 configured to provide electrical power to the engine control module 50 and to the remote interface units 40. In certain embodiments, the engine control module 50 and the power conditioning module 52 are disposed within independent housings positioned remote from one another. Accordingly, the engine control module 50 may be thermally insulated from the heat generated by the power conditioning module 52. The reduced heat flow to the engine control module 50 may facilitate tighter spacing of electronic components, thereby reducing the size of the engine controller 38. In addition, heat dissipation features, such as cooling fins and/or an active fluid cooling system, may be obviated, thereby reducing the cost and complexity of the engine controller 38.

In the illustrated embodiment, the power conditioning module 52 is configured to provide electrical power to a first electrical bus 54 and a second electrical bus 56. As will be appreciated, the first and second electrical busses 54 and 56 provide a redundant power distribution system that increases the availability of the turbine system 10. As illustrated, the first and second electrical busses 54 and 56 are electrically coupled to an ignition exciter 58. The ignition exciter 58 is configured to generate a high voltage signal for a first igniter 60 and a second igniter 62. The igniters are configured to initiate combustion within the combustor 16 during engine startup procedures.

The electrical busses 54 and 56 are also electrically coupled to the remote interface units 40 to provide redundant electrical power to the remote interface units 40. In addition, a first communication bus 64 and a second communication bus 66 extend between the engine control module 50 and each remote interface unit 40. The communication busses 64 and 66 are configured to provide redundant signals between the engine control module 50 and the remote interface units 40. In the illustrated embodiment, one remote interface unit 40 includes two local loop closure modules 42 to provide redundant closed-loop control of an operational parameter. As illustrated, the remote interface unit 40 is divided into a channel A section, and a channel B section. Each channel is configured to independently control the same operational parameter, thereby providing redundant control. As illustrated, the first electrical bus 54 is coupled to the channel A section, and the second electrical bus 56 is coupled to the channel B section. Accordingly, if one channel is disabled due to an interruption in electrical power, the other channel may continue operation. Similarly, the first communication bus 64 is coupled to a communication module 68 in the channel A section, and the second communication bus 66 is coupled to a communication module 68 in the channel B section. In this configuration, if one channel is disabled due to an interruption in one communication bus, the other channel may continue operation.

Furthermore, the channel A section includes a first local loop closure module 42 communicatively coupled to a first communication module 68, and the channel B section includes a second local loop closure module 42 communicatively coupled to a second communication module 68. The communication modules 68 are configured to establish a communication link between an interface controller 70 in the local loop closure module 42 and the respective communication bus. Consequently, an input signal from the engine controller 38 may be sent to the local loop closure module 42, and a return signal may be sent from the local loop closure module 42 to the engine controller 38. For example, the input signal from the engine controller 38 may be indicative of a target value of an operational parameter. The return signal may be indicative of a measured value of the operational parameter, and/or an operational status of the local loop closure module 42. Accordingly, the engine controller 38 may monitor the value of each operational parameter to determine whether a parameter exceeds a threshold value, and/or to facilitate control of the turbine system 10. In addition, the engine controller 38 may monitor the health/operational status of each component within the distributed engine control system 36.

As will be appreciated, a variety of communication protocols may be employed to establish a communication link between the communication modules 68 and the engine control module 50. For example, the first communication bus 64 and the second communication bus 66 may utilize a balanced digital multipoint network (e.g., RS-485) to facilitate communication throughout the distributed engine control system 36. The communication buses 64 and 66 may also employ other wired or wireless communication protocols. For example, if a wireless communication link is employed, the reduced wiring may substantially reduce the weight and complexity of the distributed engine control system 36. In certain embodiments, the communication modules 68 may be configured to communicate with the engine control module 50 via the electrical busses 54 and 56. For example, the engine control module 50 and the communication modules 68 may be configured to modulate an electrical power signal such that input and feedback signals may be transmitted throughout the distributed engine control system 36, thereby obviating separate wired connections.

As previously discussed, each local loop closure module includes an interface controller 70 configured to provide closed-loop control of a parameter associated with operation of the turbine system 10. In addition, each channel of the remote interface unit 40 includes a sensor 72 and an actuator 74 communicatively coupled to a respective interface controller 70. The actuator 74 is configured to adjust an operational parameter of the turbine system 10, the sensor 72 is configured to output a feedback signal indicative of a measured value of the operational parameter, and the interface controller 70 is configured to provide closed-loop control of the actuator 74 based on the feedback signal and an input signal from the engine controller 38 indicative of a target value of the operational parameter. In the illustrated embodiment, the channel A actuator 74 and the channel B actuator 74 may be configured to adjust the same operational parameter (e.g., compressor vane angle, fuel valve position, cooling air valve position, etc.). Similarly, the channel A sensor 72 and the channel B sensor 72 may be configured to measure a value of the same parameter. In certain embodiments, the channel A sensor 72 and the channel B sensor 72 may be disposed within a common housing and/or may include a common sensing element. In such embodiments, separate conductors may extend from the common housing/sensing element to each respective interface controller 70.

By way of example, the engine control module 50 may output a signal indicative of a target value of an operational parameter to the channel A section of the remote interface unit 40 via the first communication bus 64. The channel A communication module 68 may receive the signal, and convey the target value to the interface controller 70 within the channel A local loop closure module 42. The controller 70, in turn, may instruct the actuator 74 to adjust the operational parameter until the sensor 72 indicates that the target value is achieved. The interface controller 70 may then cyclically monitor the value of the parameter via a feedback signal from the sensor 72, and instruct the actuator 74 to compensate for any variations from the target value. In this manner, the channel A local loop closure module 42 may provide closed-loop control of one parameter associated with operation of the turbine system 10.

It should be appreciated that a variety of actuators 74 may be employed throughout the turbine system 10. For example, the turbine system 10 may include mechanical, electromechanical, pneumatic and/or hydraulic linear actuators and/or rotary actuators. Certain components of the turbine system 10 may be adjusted by a two-element electro-hydraulic actuator that employs fuel as the working fluid. By way of example, vanes within the compressor 22 may be coupled to a hydraulically driven element of an electro-hydraulic actuator. The hydraulically driven element is configured to adjust an angle of the vanes based on fuel pressure to the actuator element. The electro-hydraulic actuator also includes a second element configured to regulate fuel pressure to the hydraulically driven element. The second element may be an electrically controlled (e.g., via a solenoid, stepper motor, etc.) valve communicatively coupled to the interface controller 70. Accordingly, the interface controller 70 may adjust the angle of the compressor vanes by regulating fuel pressure to the hydraulically controlled element via actuation of the electrically controlled element. In certain embodiments, the remote interface unit 40 may be disposed within the hydraulically driven element (e.g., a fuel metering unit) to facilitate cooling of electronic components within the interface controller 70, thereby increasing the longevity of the remote interface unit 40.

In certain embodiments, the actuator 74 may be an electric torque motor, and the sensor 72 may be a position sensor, such as a linear variable differential transformer (LVDT). In such embodiments, the controller 70 may instruct the electric torque motor to adjust an operational parameter until the position sensor indicates that a target value is achieved (e.g., a component has been rotated through a desired angle, a component has been translated a desired distance, etc.). The interface controller 70 may then cyclically monitor the value of the parameter via a feedback signal from the position sensor, and instruct the electric torque motor to compensate for any variations from the target value.

Similar to the communication busses 64 and 66, a variety of communication protocols may be employed to establish a communication link between the sensor 72 and the interface controller 70, and between the actuator 74 and the interface controller 70. For example, the sensor 72 and/or the actuator 74 may be communicatively coupled to the interface controller 70 by one or more conductors, thereby facilitating transmission of analog or digital signals. As will be appreciated, digital signals may be multiplexed, thereby enabling multiple signals (e.g., from one or more sensors 72, and/or from one or more actuators 74) to be transmitted through a single bus. In addition, a wireless communication link may be employed to reduce wiring.

In certain embodiments, the interface controller 70 is configured to monitor the operational status of the local loop closure module 42. If an anomaly is detected that may interfere with operation of the local loop closure module, the interface controller 70 may instruct the communication module 68 to send a signal to the engine control module 50 indicative of the anomaly. The engine control module 50 may then disable the channel A section of the remote interface unit 40, and instruct the channel B section to control the operational parameter. Similarly, if electrical power to the channel A section is disrupted and/or communication with the engine control module 50 is interrupted, the engine control module 50 may disable the channel A section of the remote interface unit 40, and enable the channel B section.

In certain embodiments, the channel A section and the channel B section of the remote interface unit 40 may be operated concurrently. In such embodiments, a communication link 76 between the interface controllers 76 may facilitate communication between the local loop closure modules 42. For example, the channel A sensor 72 and the channel B sensor 72 may concurrently measure the same operational parameter. The interface controllers 70 may compare the measured values to one another, and identify discrepancies. If a discrepancy is detected (e.g., the difference between measured values exceeds a threshold value), the interface controllers 70 may select the appropriate measurement and/or report the discrepancy to the engine control module 50 for analysis/interpretation. If the interface controllers 70 and/or the engine control module 50 determine that one sensor 72 is not producing accurate measurements, the interface controllers 70 and/or the engine control module 50 may disable the respective channel of the remote interface unit 40, and instruct the other channel to provide closed-loop control of the operational parameter.

In certain embodiments, each local loop closure module 42 is configured to operate at a higher frequency than the engine control module 50. For example, the interface controller 70 may be configured to receive a feedback signal from the sensor 72 and adjust the actuator 74 at a frequency of about 5 Hz, 10 Hz, 25 Hz, 50 Hz, 100 Hz or more. Conversely, the engine control module 50 may send a signal indicative of a target value of an operational parameter to the remote interface unit at a frequency of about 1 Hz, 2 Hz, or 3 Hz, for example. Due to the lower operational frequency of the engine control module 50, less data is sent through the communication busses 64 and 66, as compared to configurations in which a centralized engine controller receives signals from the sensors and adjusts the actuators at a higher frequency. Accordingly, a lower bandwidth network may be employed, thereby reducing the cost of the engine control system.

While the illustrated remote interface unit 40 includes two channels configured to control one operational parameter, it should be appreciated that alternative remote interface units may include more or fewer channels to control one or more parameters associated with operation of the turbine system. For example, in certain embodiments, a remote interface unit 40 may include 1, 2, 3, 4, 5, 6, or more channels to control one operational parameter. As previously discussed, more than one channel provides redundant control of the operational parameter, thereby increasing the availability of the turbine system 10. In addition, it should be appreciated that certain remote interface units 40 may be configured to control multiple operational parameters, with one or more channels associated with each parameter. For example, certain remote interface units may be configured to control 1, 2, 3, 4, 6, 8, 10, 15, 20, 25, 30, 35, 40, 50, or more parameters associated with operation of the turbine system 10. By way of example, a remote interface unit may be configured to control more than 1, 5, 10, 20, 30, 40, or more operational parameters.

Moreover, while the illustrated remote interface unit 40 includes separate communications modules 68 to establish a communication link between the engine control module 50 and the respective local loop closure module 42, it should be appreciated that certain remote interface units may include a single communication module to facilitate communication between the engine control module 50 and each local loop closure module 42. In further embodiments, a remote interface unit 40 may include one communication module 68 for each local loop closure module associated with a particular operational parameter. In addition, certain local loop closure modules may include integrated communication modules, thereby obviating the communication module within the remote interface unit.

Each remote interface unit 40 may be particularly configured for the anticipated environmental conditions. For example, remote interface units positioned within higher temperature portions of the turbine system may be configured to effectively operate within the expected temperature range. For example, in low temperature environments, such as adjacent to the compressor 22, the electric circuits of the remote interface unit 40 may be mounted on a silicon substrate. In higher temperature environments, such as adjacent to the combustor 16 or the turbine 18, the electric circuits may be mounted on a silicon on insulator (SOI) substrate. For example, an SOI substrate may include an insulating layer (e.g., silicon dioxide) disposed between two silicon layers. If the remote interface unit 40 is mounted within the hottest regions of the turbine system 10, such as within the core of the turbine 18, the electric circuits may be mounted on a silicon carbide substrate or a gallium nitride substrate to resist the increased heat loads. In further embodiments, the remote interface unit 40 may be actively cooled to facilitate operation in high temperature environments. For example, fuel from the fuel supply 14 may pass through a heat exchanger coupled to the remote interface unit 40 before flowing to the combustor 16, thereby reducing the operating temperature of the remote interface unit 40.

Because the sensors are not disposed within the engine controller, the size of the engine controller may be reduced, thereby facilitating engine controller mounting within an engine nacelle. Furthermore, the number of controlled parameters may be adjusted by varying the number of remote interface units and/or the number of actuators/sensors within each remote interface unit. Accordingly, a single engine controller configuration may be employed to control operation of a variety of engine configurations (e.g., having different numbers and/or types of operational parameters), thereby obviating the process of redesigning and recertifying the engine controller for each engine configuration. As a result, engine development costs may be significantly reduced. In addition, the engine control system 36 may utilize common remote interface unit configurations to control each parameter associated with operation of the turbine system 10. In such a configuration, the design and manufacturing costs may be further reduced by obviating the design/certification costs associated with development of multiple remote interface unit configurations.

Figure 3:
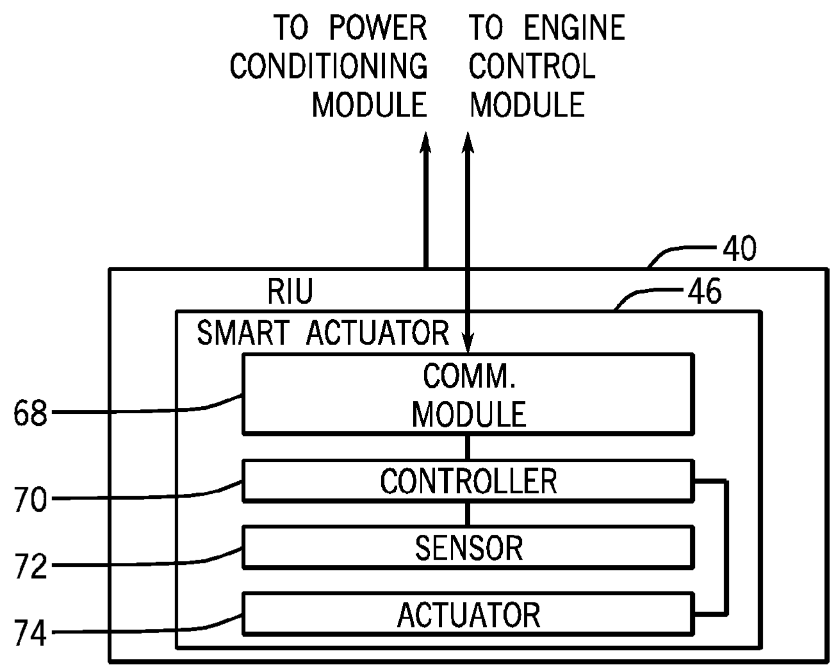
FIG. 3 is a block diagram of an embodiment of a remote interface unit that may be employed within the distributed control system of FIG. 2.

FIG. 3 is a block diagram of an embodiment of a remote interface unit 40 that may be employed within the distributed control system 36 of FIG. 2. As illustrated, the remote interface unit 40 includes a smart actuator assembly 46 having an integrated communication module 68, interface controller 70, sensor 72, and actuator 74. Such a smart actuator assembly 46 may be employed to independently control an operational parameter, or may be used in conjunction with one or more similar smart actuator assemblies 46 to provide redundant control of a parameter (i.e., each smart actuator assembly 46 serves as a channel of a multichannel control system). Remote interface units 40 having a smart actuator assembly 46 may be distributed throughout the turbine system 10 to control parameters proximate to the unit. For example, one remote interface unit 40 may be positioned adjacent to the vanes of the compressor 22 to control an angle of the vanes, and another remote interface unit 40 may be positioned adjacent to a fuel value to control fuel flow to the combustor 16. By distributing the remote interface units throughout the turbine system, the weight and complexity of the engine control system may be reduced by obviating lines/tubes, which may be employed in configurations having sensors disposed within the engine controller.

While the illustrated remote interface unit 40 includes a single smart actuator assembly 46, it should be appreciated that alternative remote interface units may include additional smart actuator assemblies (e.g., 1, 2, 3, 4, 5, 6, or more). Furthermore, it should be appreciated that certain remote interface units may include a smart actuator assembly 46, and a local loop closure module 42 having a separate sensor and a separate actuator. In addition, while the illustrated smart actuator assembly 46 includes an integrated communication module 68, it should be appreciated that alternative embodiments may employ a remote communication module 68 (e.g., configured to establish a communication link with multiple smart actuator assemblies 46). Moreover, while the illustrated smart actuator assembly 46 includes an integrated sensor 72, it should be appreciated that alternative embodiments may employ a remote sensor 72 to measure the value of a parameter remote from the actuator 74.

Figure 4:
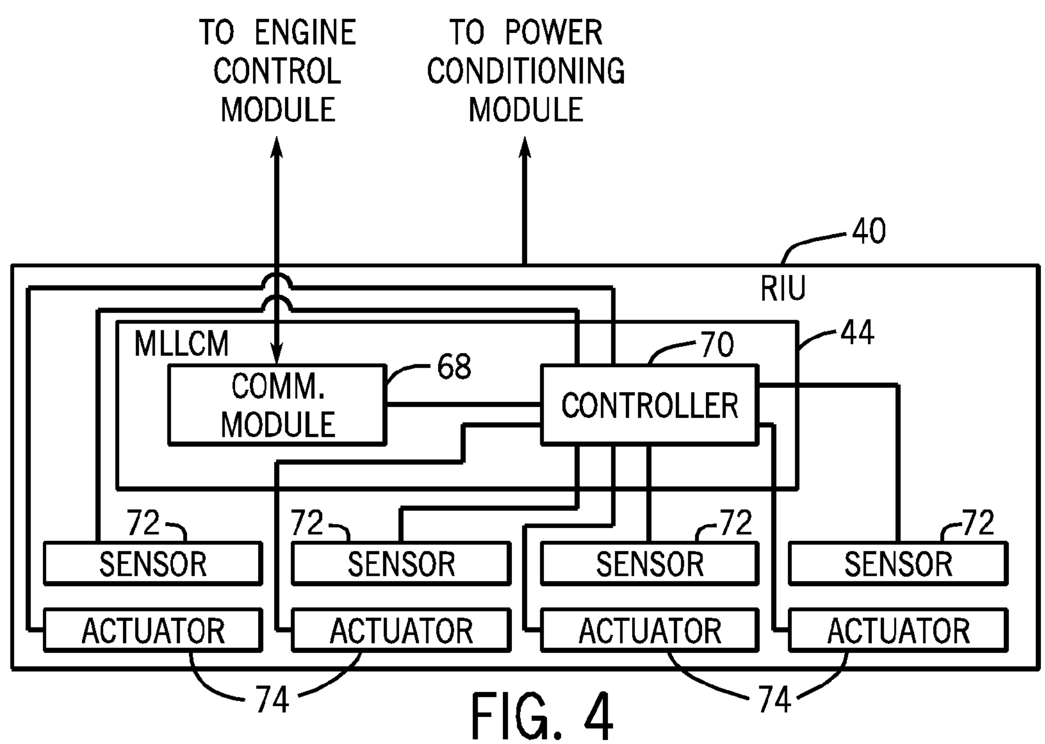
FIG. 4 is a block diagram of an alternative embodiment of a remote interface unit that may be employed within the distributed control system of FIG. 2.

FIG. 4 is a block diagram of an alternative embodiment of a remote interface unit 40 that may be employed within the distributed control system 36 of FIG. 2. In the illustrated embodiment, the remote interface unit 40 includes a multiple local loop closure module (MLLCM) 44 configured to provide closed-loop control of multiple parameters associated with operation of the turbine system 10. As illustrated, the multiple local loop closure module 44 includes an integrated communication module 68 and an interface controller 70. However, it should be appreciated that a remote communication module 68 may be employed in alternative embodiments. The remote interface unit 40 also includes multiple actuators 74 communicatively coupled to the interface controller 70, and configured to adjust a respective set of parameters associated with operation of the turbine system 10. In addition, the remote interface unit 40 includes a corresponding set of sensors 72 communicatively coupled to the interface controller 70, and configured to output respective feedback signals to the interface controller 70. The interface controller 70 is configured to provide closed-loop control of the actuators 74 based on the feedback signals, and an input signal from the engine control module 50 (e.g., received through the communication module 78) indicative of a target value of each parameter. In this configuration, a single controller 70 within the remote interface unit 40 may control multiple operational parameters associated with various components throughout the turbine system 10.

While the illustrated embodiment includes four sensors 46 and four actuators 44, it should be appreciated that alternative embodiments may include more or fewer sensors/actuators. For example, certain remote interface units 40 may include 1, 2, 3, 4, 5, 6, 7, 8, or more sensors 46, and a corresponding number of actuators 44. In addition, certain parameters may be determined by measuring multiple related parameters associated with operation of the turbine system 10. For example, a velocity of a fluid flow may be determined by measuring a static pressure and a dynamic pressure via two pressure sensors. Accordingly, the interface controller 70 may be configured to determine a parameter based on feedback signals from multiple sensors. The controller 70, in turn, may instruct an actuator to adjust the parameter based on the determined value of the parameter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine engine control system, comprising:

an engine controller configured to control a plurality of parameters associated with operation of a gas turbine engine system; and a plurality of remote interface units communicatively coupled to the engine controller, wherein each remote interface unit is configured to receive an input signal from the engine controller indicative of respective target values of at least one parameter of the plurality of parameters, and each remote interface unit is configured to provide closed-loop control of the at least one parameter based on the input signal and feedback signals indicative of respective measured values of the at least one parameter, wherein the plurality of remote interface units are distributed throughout the gas turbine engine at a compressor, a combustor, and a turbine, wherein at least one remote interface unit comprises a plurality of local loop closure modules, and each local loop closure module is configured to independently provide closed-loop control of a respective parameter of the plurality of parameters.

2. The gas turbine engine control system of claim 1, wherein each remote interface unit comprises an actuator configured to adjust the at least one parameter, and a sensor configured to output the feedback signals.

3. The gas turbine engine control system of claim 1, wherein each local loop closure module is configured to provide the closed-loop control of a respective parameter by instructing an actuator to adjust the respective parameter based on the feedback signals indicative of the respective measured values from a sensor.

4. The gas turbine engine control system of claim 1, wherein at least two of the plurality of local loop closure modules are configured to provide redundant closed-loop control of the at least one parameter.

5. The gas turbine engine control system of claim 1, wherein at least one remote interface unit of the plurality of remote interface units comprises a smart actuator assembly having an actuator configured to adjust the at least one parameter, a sensor configured to output the feedback signals, and a respective interface controller communicatively coupled to the actuator and to the sensor, wherein the interface controller is configured to provide the closed-loop control of the at least one parameter.

6. The gas turbine engine control system of claim 1, wherein each remote interface unit comprises a communication module configured to receive the input signal from the engine controller.

7. The gas turbine engine control system of claim 1, wherein the engine controller comprises an engine control module configured to control the plurality of parameters, and a power conditioning module configured to provide electrical power to the engine control module and to the plurality of remote interface units, wherein the engine control module and the power conditioning module are disposed within independent housings positioned remote from one another.

* * * * *